United States Patent [19]

Sakamaki

[11] Patent Number: 5,009,439
[45] Date of Patent: Apr. 23, 1991

[54] CHUCK FOR TOOLS

[75] Inventor: Iwao Sakamaki, Ojiya, Japan

[73] Assignee: Sakamaki Mfg. Co., Ltd., Ojiya, Japan

[21] Appl. No.: 216,754

[22] Filed: Jul. 8, 1988

[30] Foreign Application Priority Data

Jul. 21, 1987 [JP] Japan .................. 62-181563
Feb. 29, 1988 [JP] Japan .................. 63-47315

[51] Int. Cl.⁵ .................................. B23B 31/12
[52] U.S. Cl. ................... 279/62; 279/1 K; 408/240
[58] Field of Search ............ 279/60, 61, 1 B, 1 Q, 279/62-65; 408/240

[56] References Cited

U.S. PATENT DOCUMENTS

| 1,513,332 | 10/1924 | McConnell | 279/62 |
| 1,773,034 | 8/1930 | Englund | 279/60 |
| 3,807,745 | 4/1974 | Bent | 279/60 |
| 4,381,116 | 4/1983 | Futter | 279/62 |
| 4,423,881 | 1/1984 | Whitehead | 279/60 X |
| 4,449,722 | 5/1984 | Knaggs | 279/62 |
| 4,536,113 | 8/1985 | Hatfield | 279/1 K X |

FOREIGN PATENT DOCUMENTS

| 0188354 | 7/1986 | European Pat. Off. |
| 2614030 | 10/1977 | Fed. Rep. of Germany ........ 279/62 |
| 2606691 | 5/1988 | France |
| 1468639 | 3/1977 | United Kingdom |

Primary Examiner—Larry I. Schwartz
Assistant Examiner—Robert Schultz
Attorney, Agent, or Firm—Fulbright & Jaworski

[57] ABSTRACT

A chuck for tools comprises a main body in which an axial center hole and a plurality of slanting holes extending radially from the center hole are formed, a plurality of jaws each being slidably inserted in each slanting hole and formed, at its outer surface, with a male screw, a rotary member having a female screw in meshing engagement with the male screws and mounted in the main body so as to be permitted for only rotation, a first grip integrally connected to the main body, and a second grip securely connected to the rotary member to cooperate therewith.

2 Claims, 9 Drawing Sheets

FIG. I
PRIOR ART
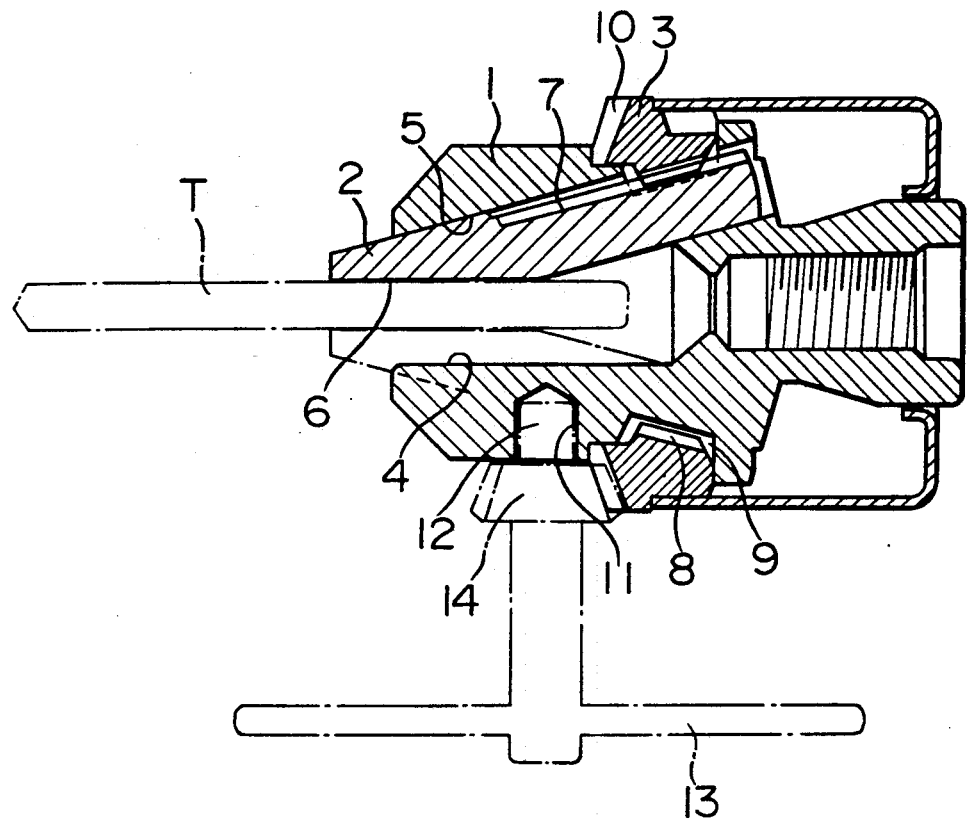
FIG. 2
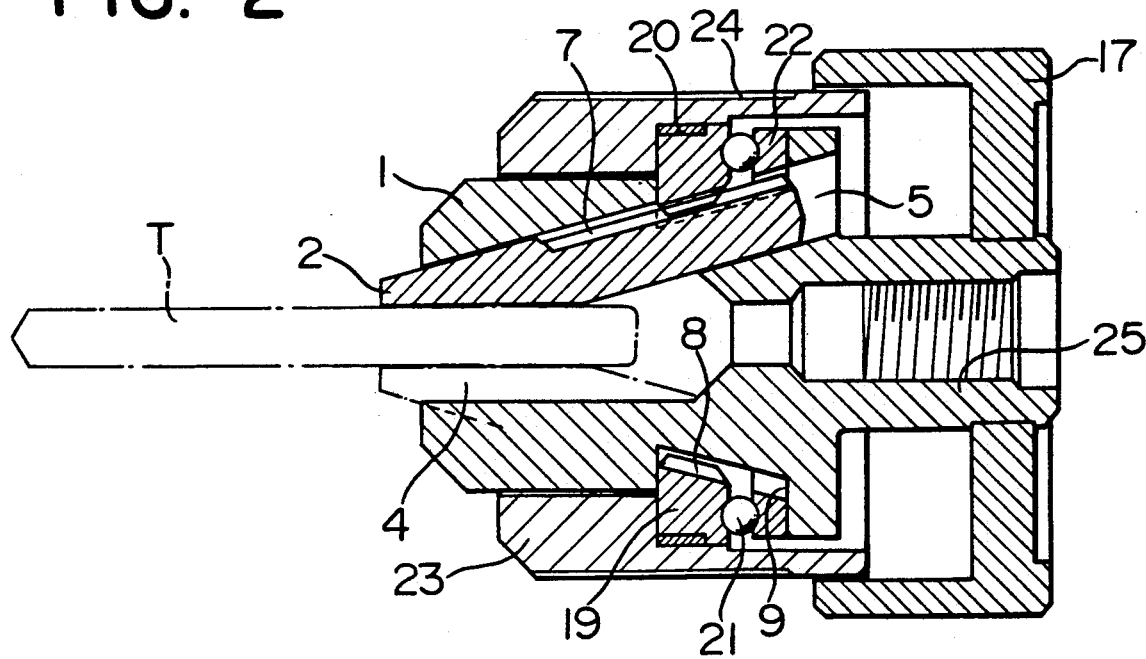

CHUCK FOR TOOLS

BACKGROUND OF THE INVENTION

1. Field of the Invention

This invention relates to a chuck for tools such as drills.

2. Description of the Prior Art

Conventionally, a typical example of this type of chuck for tools has been known as disclosed in Japanese Patent Publication No. 55-25002 (U.K.P. No. 1468639) and will be explained herein with reference to FIG. 1 in the accompanying drawings.

This prior art chuck has a main body 1 and in the forward end portion of the main body 1, a center hole 4 is bored which extends axially in order that the shank of a tool T is received in the center hole 4. This center hole 4 branches at equal angular intervals to a plurality of (typically three) slanting holes 5 which extend obliquely toward the rear of the chuck, and jaws 2 are slidably inserted in the slanting holes 5.

Each jaw 2 has, at its forward end, an inner surface 6 which extends in parallel with the axis line of the main body 1, and when the jaws 2 are advanced forwardly (to the left in the illustration), they clamp the tool T as shown in FIG. 1. Threaded on the rearward outer surface of each jaw 2 is a male screw 7 which meshes with a female screw 8 of a rotary member 3 rotatably received in an annular groove 9 formed in the main body 1. The rotary member 3 is formed, at its forward end, with a bevel gear 10. The main body 1 has a radial blind hole 11.

With the chuck for tools constructed as above, in order to move the jaws 2 within the main body 1, a tip end shape 12 of a handle 13 is inserted to the blind hole 11 to bring a bevel gear 14 of the handle 13 into meshing engagement with the bevel gear 10 and the rotary member 3 is then rotated by rotating the handle 13. This rotation of the rotary member 3 cooperates with the screws 7 and 8 to move the jaws 2 along the slanting holes 5, so that the tool T may be clamped by the jaws 2 when they are advanced and released from the jaws 2 when they are retreated.

This prior art chuck for tools needs the separate handle 13, independent of the chuck per se, for the purpose of moving the jaws 2 and it is impossible to move the jaws 2 without using the handle 13. If the handle 13 is lost or can not be found at hand, one may try to clamp or release the tool T by rotating the rotary member 3, but the rotary member 3 may only be rotated together with the main body 3 and the trial may be done in vain, indicating a failure to accomplish the intended purpose.

SUMMARY OF THE INVENTION

An object of this invention is to eliminate the disadvantages of the prior art chuck for tools and to provide a chuck for tools which can be operated by itself without resort to any tools independent of the chuck to move the jaws so as to clamp or release a tool.

According to the invention, to accomplish the above object, a chuck for tools comprises a main body in which an axial center hole and a plurality of slanting holes extending radially from the center hole are formed, a plurality of jaws each being slidably inserted in each slanting hole and formed, at its outer surface, with a male screw, a rotary member having a female screw in meshing engagement with the male screws and mounted in the main body so as to be permitted for only rotation, a first grip integrally connected to the main body, and a second grip securely connected to the rotary member to cooperate therewith.

With the chuck for tools constructed above, the jaws can be advanced or retreated within the slanting holes in the main body with the aim of clamping or releasing the tool by relatively rotating the first grip of main body gripped by one hand and the second grip of rotary member gripped by the other hand in one direction or in the direction reverse thereto. This relative rotation causes the female screw of the rotary member to rotate relative to the main body and the male screws, in meshing engagement with the female screw, of the jaws axially slidably inserted in the slanting holes in the main body act to cause the jaws to advance or retreat.

As is clear from the above, the chuck for tools in accordance with the invention does not require any operation tools independent of the chuck, such as the handle used conventionally, for the sake of moving the jaws, and the chuck per se can readily be operated by hand to clamp the tool securely or to release the tool.

Another object of this invention is to provide a chuck for tools in which the relative rotation between the first and second grips can be effected by a relatively small force.

This second object can be accomplished by interposing bearing balls between relatively rotatable opposing surfaces of the main body and the rotary member. Thus, the bearing balls can considerably reduce friction between the opposing surfaces to realize light rotation.

Still another object of this invention is to provide a chuck for tools in which the tool once clamped by the jaws can automatically be clamped more strongly by merely continuing rotating the second grip in the same direction for clamping.

To accomplish this third object, the rotary member and the second grip are coupled together by means of a coupling member made of a resilient material and when a reaction force of tool clamping force generated in the course of the rotation of the second grip is transmitted to the rotary member, the coupling member releases the rotary member from coupling to the second grip and the rotary member undergoing release from coupling stops rotating and displaces rearwardly. A pusher member making surface contact to part of the first grip is interposed between the first and second grips and when the rotation of the second grip continues during the displacement of the rotary member, the pusher member causes the rotary member to displace forwardly. Thus, upon generation of the reaction force of tool clamping force, the rotation of the rotary member is stopped but a rearward pushing force is generated to permit the pusher member to rotate together with the second grip. This rotation of the pusher member causes the pusher member to advance forwardly and an advancing force is transmitted to the jaws through the rotary member to cause the jaws to clamp the tool more strongly.

BRIEF DESCRIPTION OF THE DRAWINGS

FIG. 1 is a longitudinally section front view illustrating an typical example of prior art chuck for tools.

FIG. 2 is a section view, taken on the line 2—2 of FIG. 3 and viewed in the direction of arrow, showing a chuck for tools according to a first embodiment of the invention.

DESCRIPTION OF THE PREFERRED EMBODIMENTS

Figure 3:
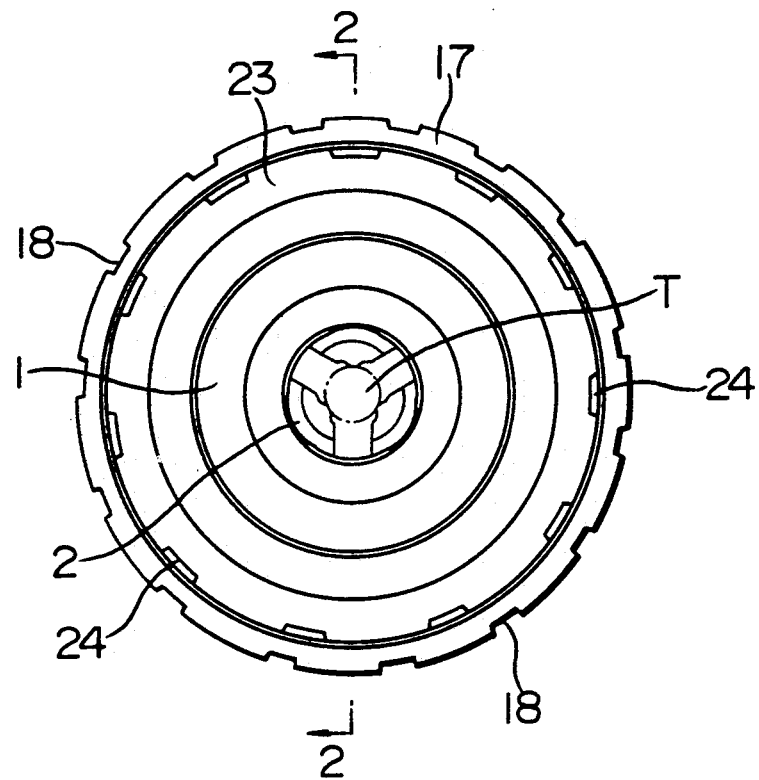
FIG. 3 is a left side view of the FIG. 2 embodiment.

Figures in the accompanying drawings following FIG. 2 inclusive illustrate first seventh embodiments of the invention and in these figures, members used in common for these embodiments and similar to those of the prior art example will be designated by the same reference numerals as used in FIG. 1 and only the other different members will be designated by different reference numerals.

In the first embodiment as shown in FIGS. 2 and 3, a main body 1 has a rear shaft 25, and a cylindrical first grip 17 has its flat bottom integrally connected to the rear shaft 25 and its outer circumferential periphery formed with a great number of axial recesses 18.

An annular groove 9 is formed in the main body 1, and in forward part of the annular groove 9, there is disposed a rotary member 19 consisting of a plurality of divided segments which are put together by means of a hoop 20 and in rearward part of the annular groove 9, there is disposed an annular seat 22. A number of bearing balls 21 are received in annular grooves respectively formed in the two members 19 and 22. The inner wall of each segment of the rotary member 19 is thread with a female screw 8 which meshes with a male screw 7 threaded on each jaw 2, and a cylindrical second grip 23 is securely connected to the rotary member 19 through the medium of the hoop 20. The second grip 23 has its rear end which is loosely fitted in a cavity of the first grip 17, providing for a gap between grips 17 and 23, and has its outer circumferential periphery formed with a number of axial grooves 24.

In this embodiment, when clamping or releasing a tool T, the first grip 17 is gripped by one hand and the second grip 23 is gripped by the other hand and thereafter the two grips 17 and 23 are relatively rotated in one direction or in the direction reverse thereto. Since the female screw 8 threaded on the rotary member 19 is in meshing engagement with the male screws 7 on the jaws 2, this relative rotation causes the jaws 2 to advance or retreat depending upon the direction of rotation of the rotary member 19.

Thanks to the bearing balls 21 interposed between the rotary member 19 and the seat 22 forming part of the main body 1, the rotary member 19 can be rotated lightly.

FIGS. 4 to 7 show a second embodiment of the invention.

A first grip 27 in this embodiment differs from the corresponding grip of the first embodiment only in that an axial small hole 28 is bored through the flat bottom near its outer circumferential edge.

A main body 1 is recessed to form an annular groove 9 and provide an abutment 32 for supporting bearing balls 21 in the radial direction. A hoop 20 is applied to a rotary member 29 as in the first embodiment but in the present embodiment, the rotary member 29 is not connected to a second grip 33 through the medium of the hoop 20. The interconnection between the two members 29 and 33 is accomplished by means of a coupling member 30 in the form of an annular resilient member, as will be described hereinafter. The second grip 33 has a rearward inner circumferential surface cooperative with the rotary member 29 to support the bearing balls 21, and in a cavity defined by the rearward inner circumferential surface, a cylindrical transmission member 34 is mounted not rotatably but axially movably with respect to the second grip 33, that is, in spline fashion, for example.

Figure 4:
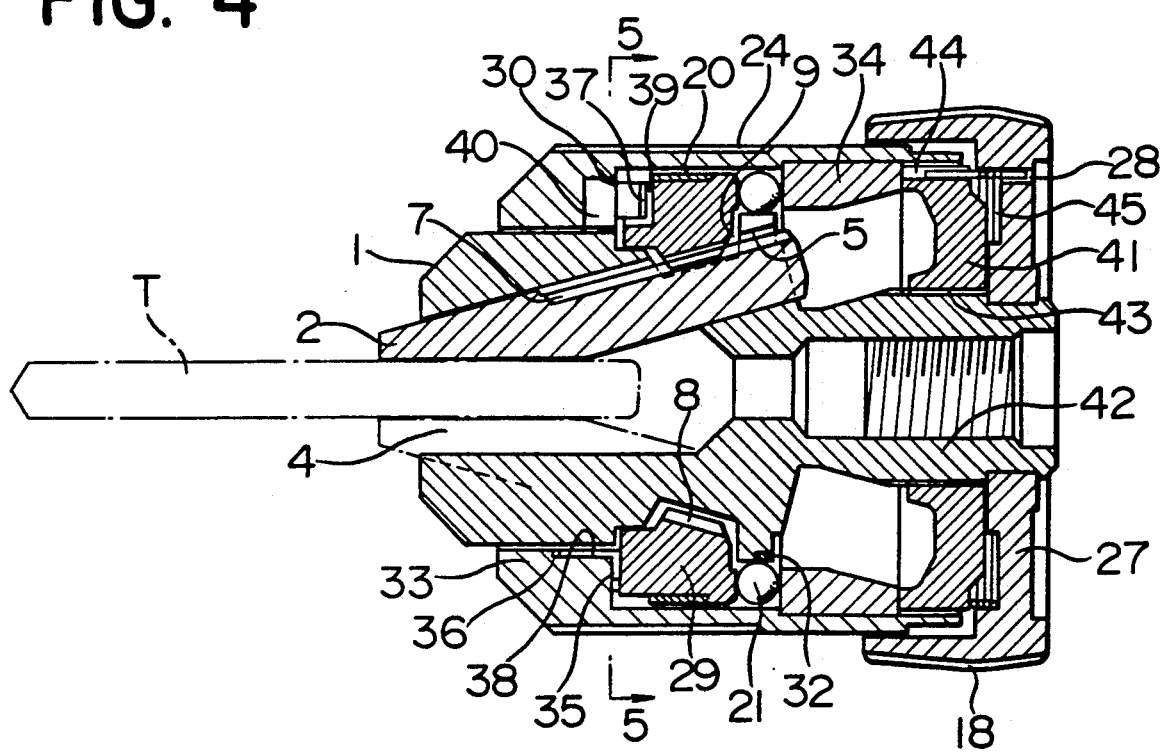
FIG. 4 is a longitudinally sectional front view illustrating a chuck for tools according to a second embodiment of the invention.
Figure 5:
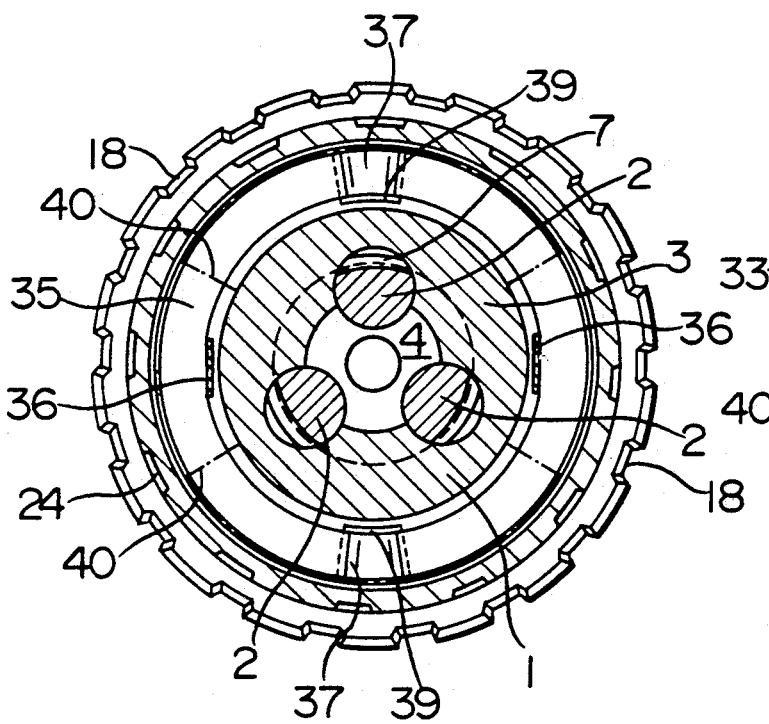
FIG. 5 is a sectional view taken on the line 5—5 of FIG. 4 and viewed in the direction of arrow.
Figure 7:
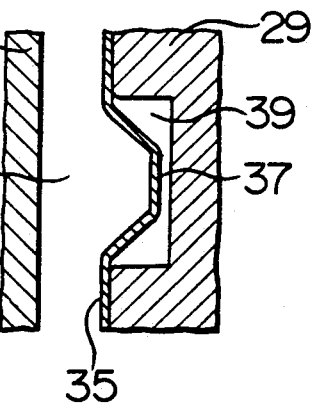
FIG. 7 is a fragmentary sectional view taken on the line 7—7 of FIG. 6.
Figure 6:
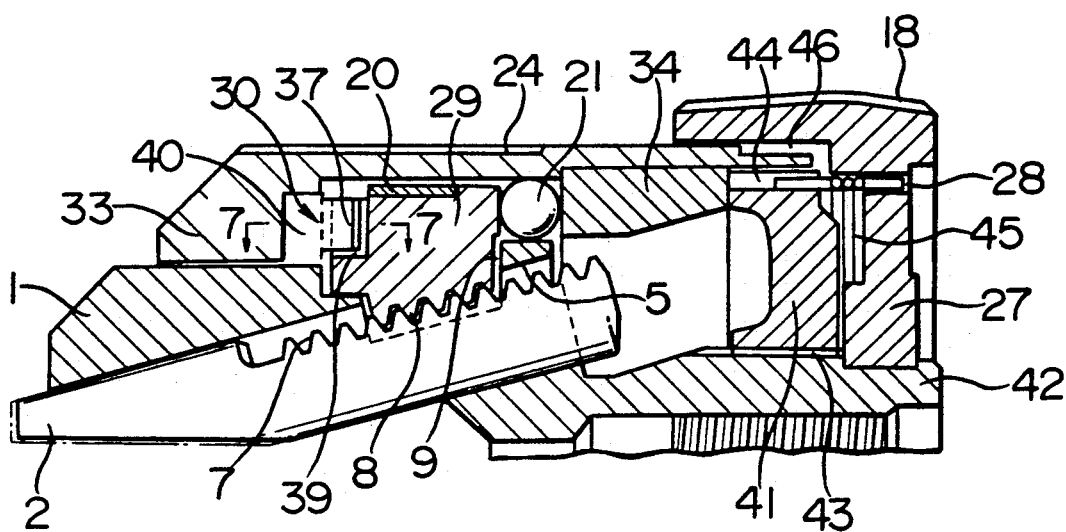
FIG. 6 is an enlarged sectional view illustrating essential part of the second embodiment placed in clamping condition.

The coupling member 30 has a ring plate 35 and the ring plate 35 is disposed between opposing circumferential surfaces of the two members 29 and 33 as best seen in FIG. 5. Two tongues 36 integral with the ring plate 35 extend forwardly from the inner circumferential edge of the ring plate 35 at about 180° spaced circumferential positions and the ring plate 35 is recessed at diametrally opposite positions, 90° spaced apart from the tongues, to form two rearward projections 37. The tongues 36 are snugly fitted in recesses 38 formed in the second grip 33 and the rearward projections 37 are received in recesses 39 formed in the rotary member 29 when the jaws 2 clamp a tool T, as best seen in FIGS. 4 and 7. The second grip 33 is formed with two sectoral recesses 40, each recess 40 having the half which makes an angle of about 60° to the center line of each recess 39.

In a cavity between the transmission member 34 and the first grip 27, there is disposed a pusher member 41 having a screw 43 in meshing engagement with a rearward shaft 42 of the main body 1. The direction of threading for the screw 43 is designed to be inverse to the direction of threading for the screws 7 and 8.

The pusher member 41 is formed with a small hole 44 which is axially aligned with the small hole 28 in the first grip 27, and the opposite projecting ends of a torsion spring 45 interposed between the first grip 27 and pusher member 41 are snugly fitted in the small holes 28 and 44.

The tool T is clamped as shown in FIG. 4 in accordance with the present invention. In order to move the jaws 2 from their release position to the illustrated clamping position, the grips 27 and 33 are relatively rotated in one direction as in the case of the first embodiment.

During this operation, as the second grip 33 rotates, the coupling member 30 having its tongues 36 snugly fitted in the recesses 38 in the second grip 33 is rotated to urge the projections 37 of the coupling member 30 against the side wall of the recesses 39 so as to eventually rotate the rotary member 29, thereby causing the screws 7 and 8 in meshing engagement with each other to advance the jaws 2 until they engage the tool T at the position illustrated in FIG. 4. During this advance of the jaws 2, the pusher member 41 is in intimate contact with the flat bottom of the first grip 27 by the action of the torsion springs 45.

Subsequently, as the second grip 33 continues to further rotate in the same direction, the jaws 2 push the rotary member 29 rearwardly and a resulting force is transmitted to the bearing balls 21 and transmission member 34 to mutually press the opposing surfaces of the transmission member 34 and pusher member 41, thereby ensuring that the pusher member 41 can rotate together with the transmission member 34 in opposition to the force of the torsion spring 45 under the influence of friction due to the mutual pressing. This rotation of the pusher member 41 cooperates with the action of the screw 43 to advance the pusher member 41 to the left, before the projections 37 of the coupling member 30 climb over the side wall of the recesses 39 in the rotary member 29 (with the ring plate 35 deflected within the sectoral recesses 40) to release the rotary member 29 from coupling with the second grip 33, thereby stopping the rotation of the rotary member 29. The advance motion of the pusher member 41 is transmitted to the rotary member 29 through the axially movable transmission member 34 and bearing balls 21, so that the rotary member 29 and the jaws 2 coupled thereto through the screws 7 and 8 are advanced from solid-line position to chained-like position in FIG. 6 to strongly clamp the tool T.

When releasing the thus clamped tool T, the second grip 33 is rotated in the other direction that is reverse to the previously-described direction. During this rotation, the rotary member 29 still remains to stop rotating but the action of the friction is mitigated, with the result that the pusher member 41 is assisted by the recovery force of the spring 45 to rotate in the reverse direction so as to recover its original position, thus removing the forward pushing force exerted by the pusher member 41 upon the rotary member 29. As the coupling member 30 is further rotated, the projection 37 return to the recesses 39 in the rotary member 29. With the projections 37 again received in the recesses 39, the rotation of the second grip 33 is transmitted to the rotary member 29 to cooperate with the screws 7 and 8 in meshing engagement so as to retreat the jaws 2, thereby releasing the tool T completely and returning all members to the state before clamping.

In the present embodiment, a spring for forwardly urging the grip 33 may be inserted in a gap 66 between the outer circumferential periphery of the second grip 33 and the inner circumferential periphery of the cylindrical portion of first grip 27. Further, in order to increase friction between the opposing surfaces of the transmission member 34 and pusher member 41, a face ratchet or a friction shoe, for example, may be interposed between these surfaces.

Figure 8:
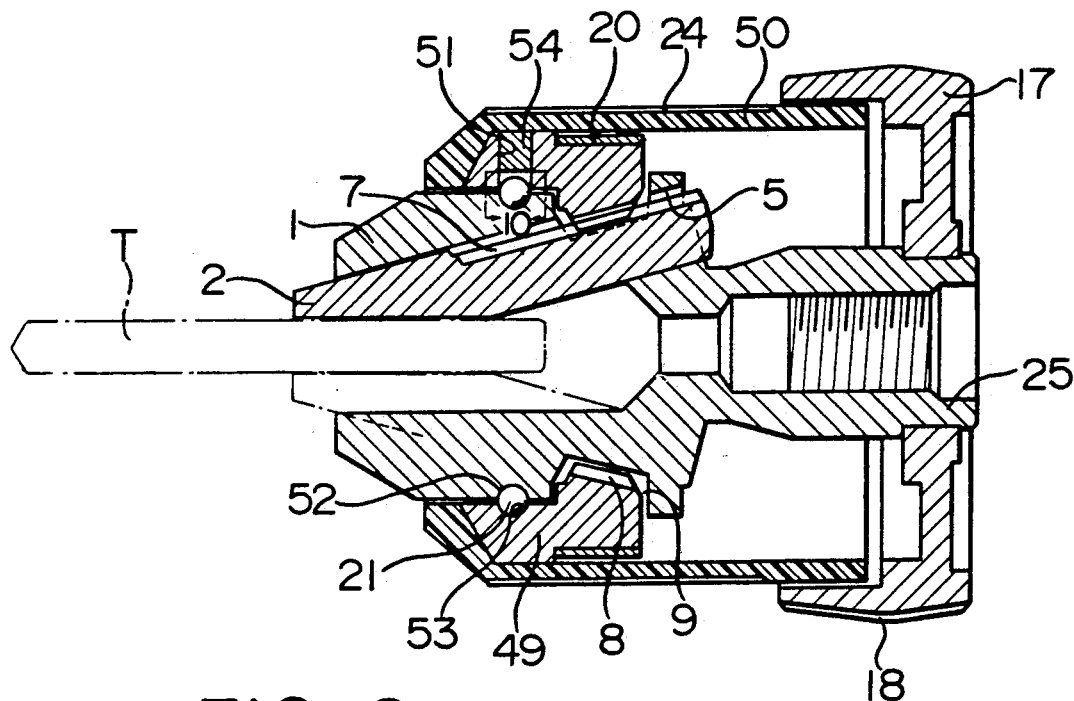
FIG. 8 is a sectional view, taken on the line 8—8 of FIG. 9 and viewed in the direction of arrow, showing a chuck for tools according to a third embodiment of the invention.
Figure 9:
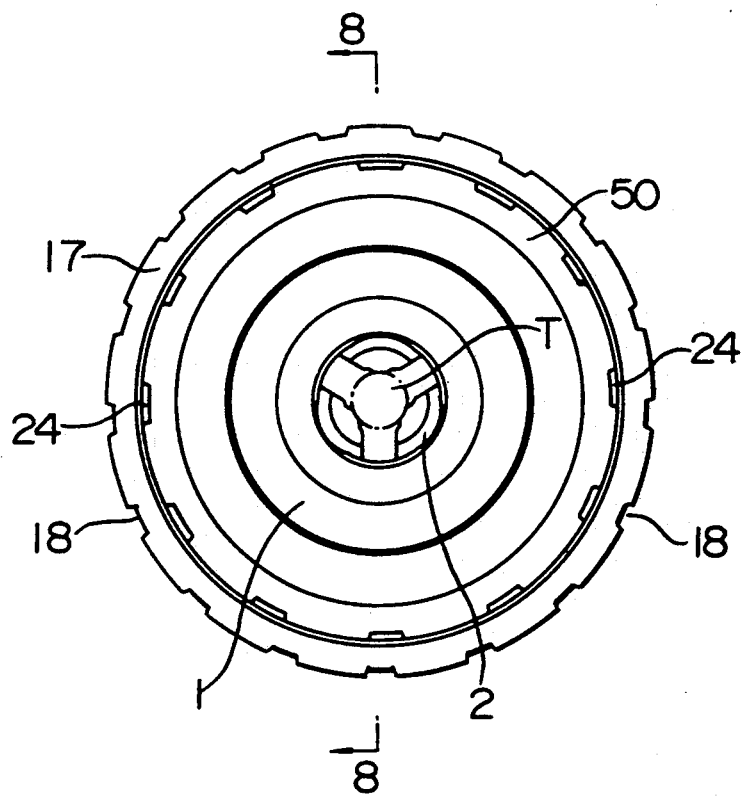
FIG. 9 is a left side view of the FIG. 8 embodiment.
Figure 10:
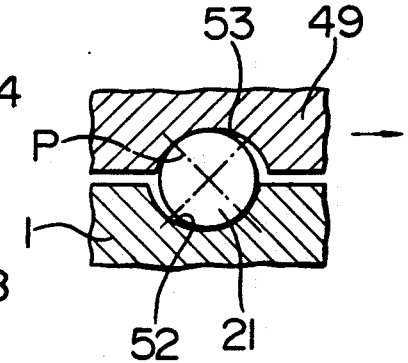
FIG. 10 is an enlarged fragmentary view showing a portion surrounded by line 10 in FIG. 8.

FIGS. 8 to 10 show a third embodiment.

A first grip 17 in this embodiment is structurally identical to the corresponding member of the first embodiment.

A second grip 50 in this embodiment is a cylindrical member made of plastic and has a forward portion in which a rotary member 49 is fixed by press fitting. The rotary member 49 is formed with a radial through hole 51, and bearing balls 21 are sequentially inserted through the through hole 51 and received in an annular groove 52 in a main body 1 and an annular groove 53 in the rotary member 49. Each of the annular grooves 52 and 53 has a cross-section defined by a radius which is larger than the radius of the bearing ball 21 (see FIG. 10). Denoted by 54 is a plug block fitted in the through hole 51.

In accordance with the present embodiment, when clamping or releasing a tool T, grips 17 and 50 gripped by hands are relatively rotated as in the previous embodiments. During this operation, a reaction force due to clamping the tool T is applied to the rotary member 49 through jaws 2 in a direction of arrow in FIG. 10. This force causes the two members 1 and 49 to apply a force to the bearing balls 21 on an inclined chained-line P, indicating that radial and axial components of the force can simultaneously be supported by the bearing balls 21 circumferentially arranged. Therefore, any separate bearings for supporting the two components of the force can be dispensed with.

Figure 11:
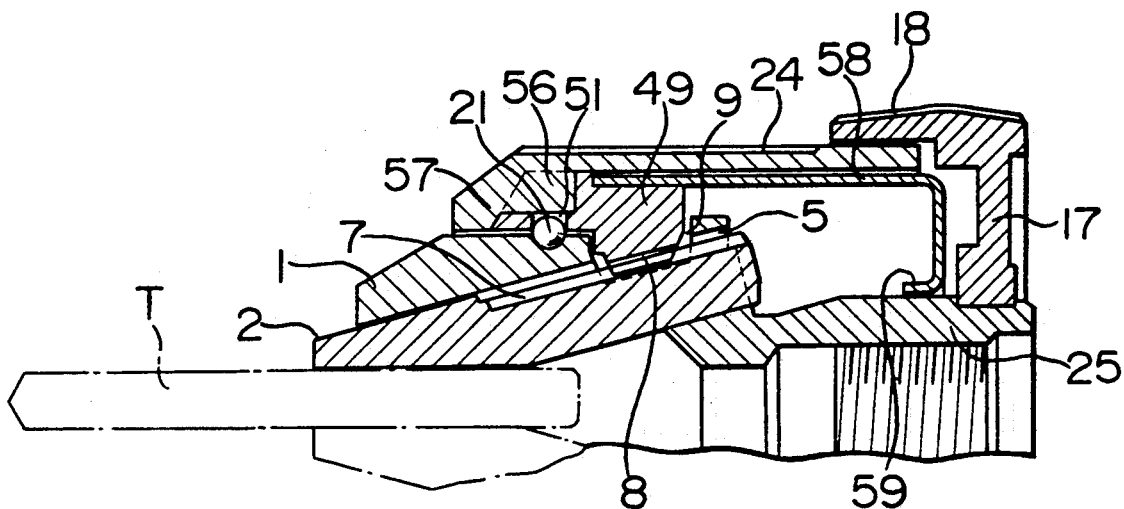
FIG. 11 is a longitudinally sectional fragmentary view showing part of a chuck for tools according to a fourth embodiment of the invention.
Figure 12:
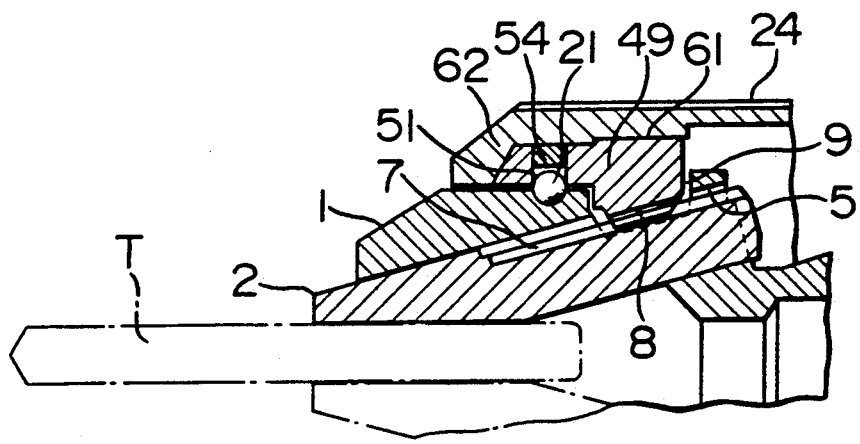
FIG. 12 is a similar view to FIG. 11 illustrating a chuck for tools according to fifth embodiment of the invention.

Fourth and fifth embodiments shown in FIGS. 11 and 12 are partial modifications of the third embodiment. Specifically, in the fourth embodiment, a plug block 56 applied to a through hole 51 for insertion of bearing balls 21 is formed integrally with the inner surface of a second grip 57, a hoop 58 for a rotary member 49, terminating in a rearward end including a first portion bent inwardly at about right angles and a second portion 59 contiguous to the inner end of the first portion and bent forwardly at about right angles, the second portion 59 being supported on a rearward shaft 25 of a main body 1.

In the fifth embodiment, hoop 61 substituting for the hoop 20 of the third embodiment by having the same function is integrally formed with the inner surface of a second grip 62.

Figure 13:
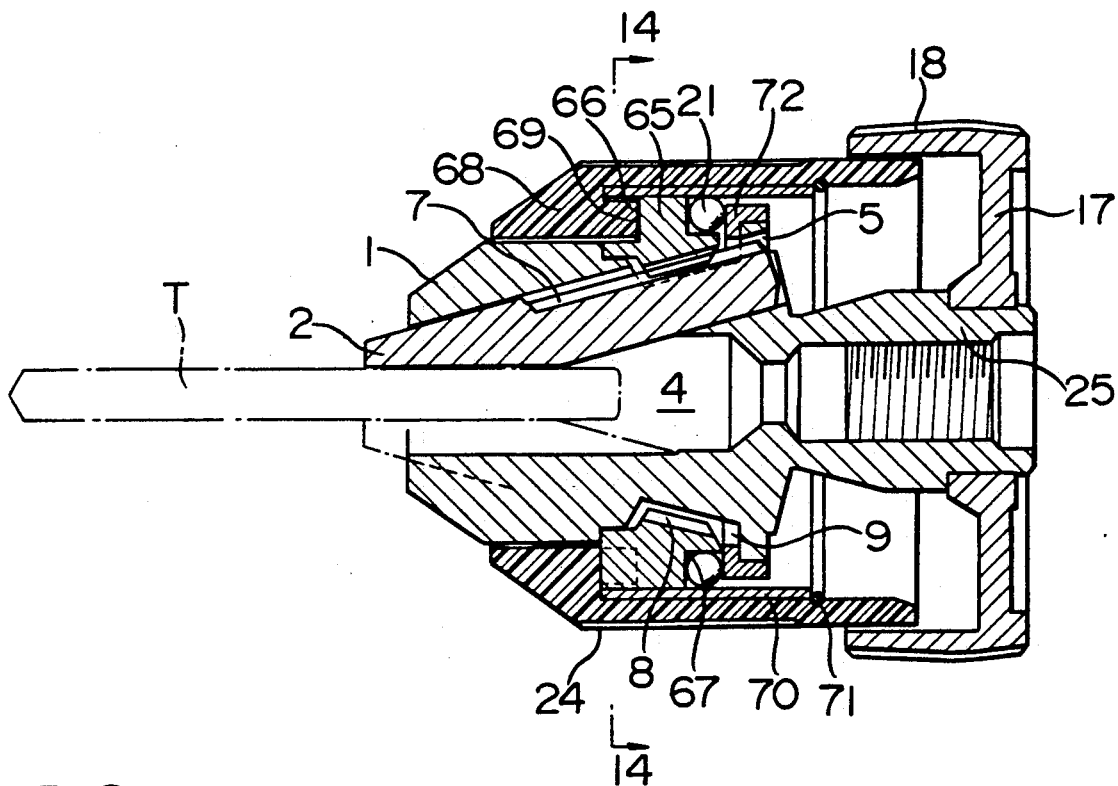
FIG. 13 is a longitudinal sectional front view illustrating a chuck for tools according to a sixth embodiment of the invention.
Figure 14:
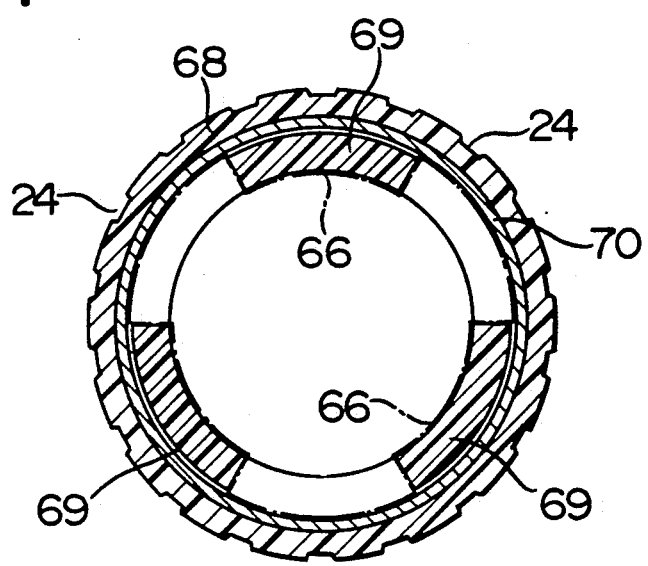
FIG. 14 is a sectional view, taken on the line 14—14 of FIG. 13 and viewed in the direction of arrow, showing the second grip of the FIG. 13 embodiment.
Figure 15:
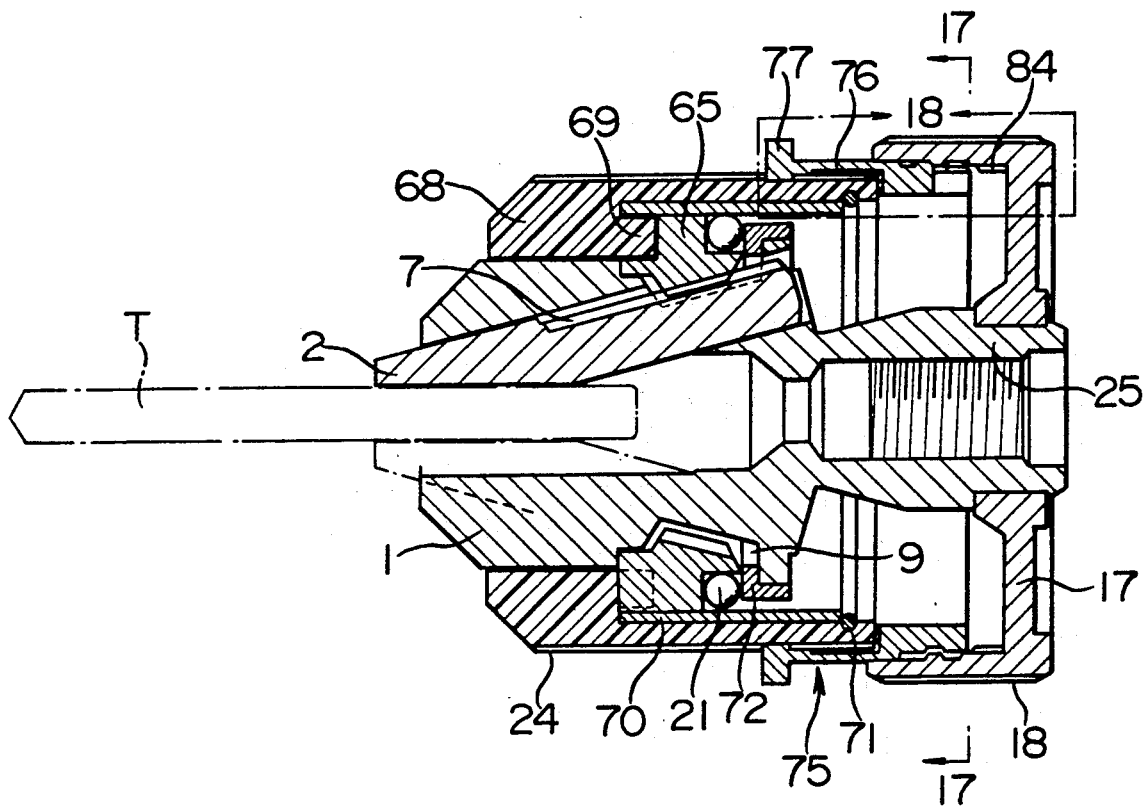
FIG. 15 is a longitudinal sectional front view illustrating a chuck for tools according to a seventh embodiment of the invention.
Figure 16:
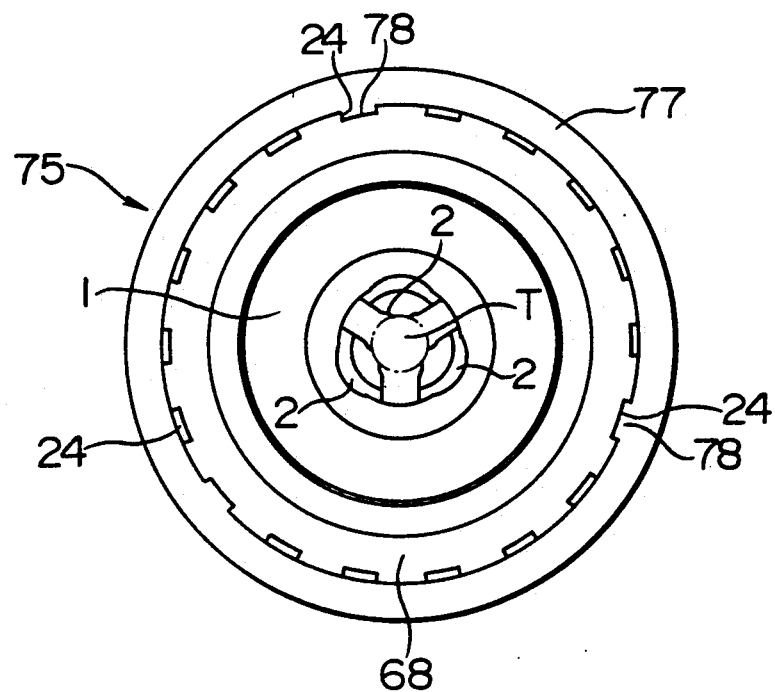
FIG. 16 is a left side view of the FIG. 15 embodiment.

FIG. 13 and 14 show a sixth embodiment.

In accordance with the sixth embodiment, a rotary member 65 is formed, at its forward surface, with a plurality of (three in the figures) sectoral recesses 66 and, at its rearward surface, with an annular step 67. A second grip 68 is made of plastic and formed with sectoral projections 69 which are fitted in the recesses 66. A hoop 70 fitted in a gap between the two members 65 and 68 by press fitting extends rearwardly, terminating in a rear-ward end which is stopped by a chip ring 71 mounted to the inner surface of the second grip 68. Bearing balls 21 are disposed in a cavity defined by the annular step 67, the hoop 70 and a support ring 72 provided on a portion, confronting the balls 21, of a main body 1.

A seventh embodiment as shown in FIGS. 15 to 20 is a partial modification of the sixth embodiment and in the present embodiment, a buffer stop cylinder 75 is interrupted between first and second grips 17 and 68.

Figure 17:
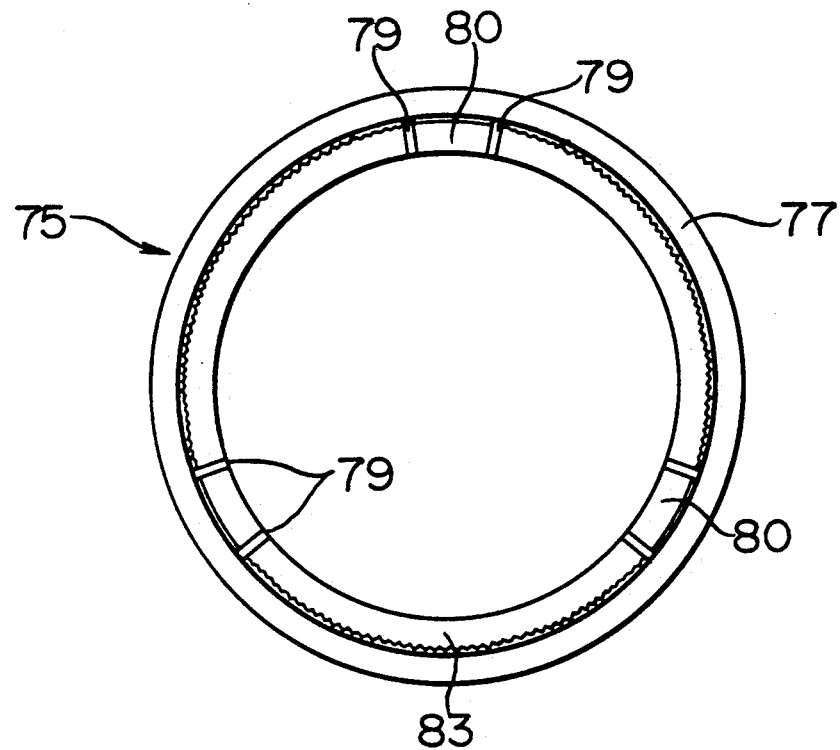
FIG. 17 is a sectional view, taken on the line 17—17 of FIG. 15 and viewed in the direction of arrow, showing a buffer cylinder of the FIG. 15 embodiment.
Figure 20:
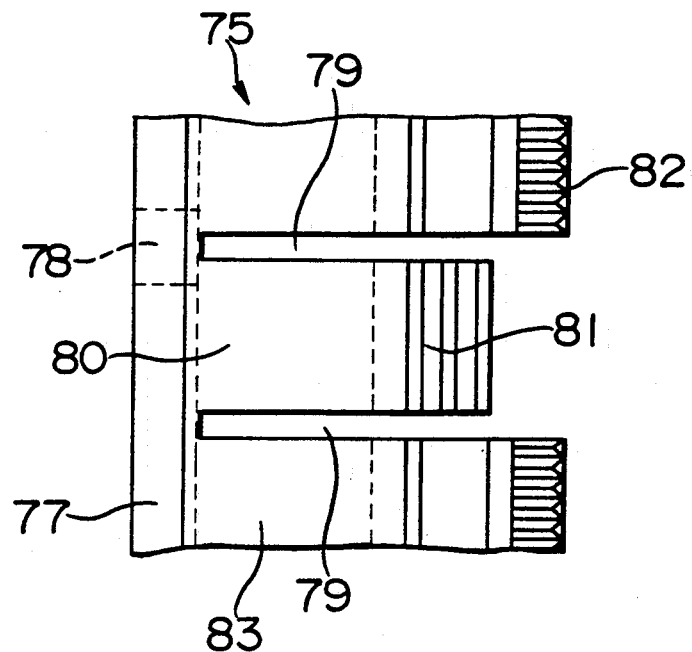
FIG. 20 is a developed plan view showing part of the buffer cylinder of the FIG. 15 embodiment.

The buffer stop cylinder 75 has a cylindrical main body 76 which has, at its forward outer circumferential edge, a flange 77 and, at its forward inner circumferential edge, a plurality of (three in the illustration) projections 78 which are slidably inserted in recesses 24 formed in the outer periphery of the second grip 68. As best seen in FIGS. 17 and 20, the main body 76 is axially cut from the rearward end thereof to form a plurality of pairs (three pairs in the illustration) of radial cuttings 79, thus providing a plurality of (three in the illustration) pawls 80 at equal angular intervals. The rearward end of each resilient pawl 80 is formed with an engaging recess 81. A cylinder wall portion 83 intervening between adjacent resilient pawls 80 and integral with buffer stop cylinder 75 is formed, at its rearward end, with serrations 82.

An inner circumferential surface portion, facing the serrations 82, of the first grip 17 is formed with serrations 84 which are slidably engageable with the serrations 82. An annular projection 85 extending from the inner circumferential surface of the fast grip 17 is engageable with the engaging recess 81.

In the fourth to seventh embodiments, clamping and releasing of the tool T can be effected through the same operation as in the case of the first to third embodiments and will not be described herein.

Figure 18:
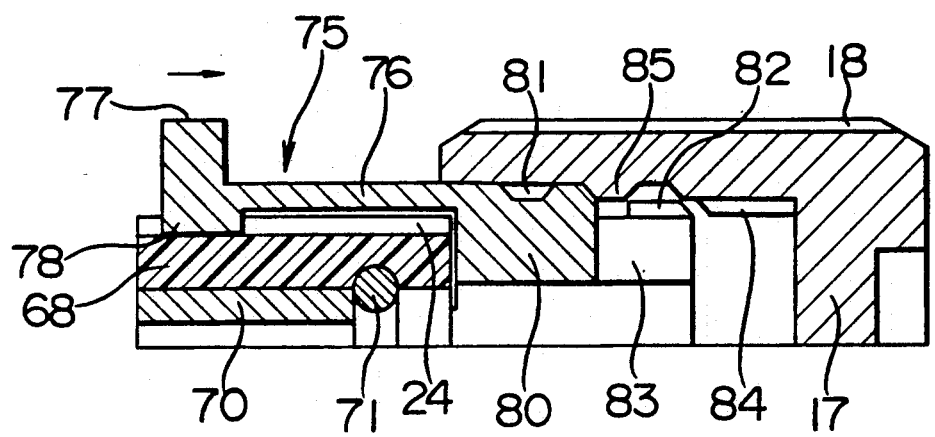
FIG. 18 is a enlarged view showing a portion surrounded by line 18 in FIG. 15.

In connection with the seventh embodiment, FIG. 18 particularly illustrates the state before clamping. The clamping operation is started from this state by relatively rotating the first and second grips 17 and 68. During this operation, the buffer stop cylinder 75 is rotated together with the second grip 68 since the projections 78 of the buffer stop cylinder 75 are in engagement with the recesses 24.

Figure 19:
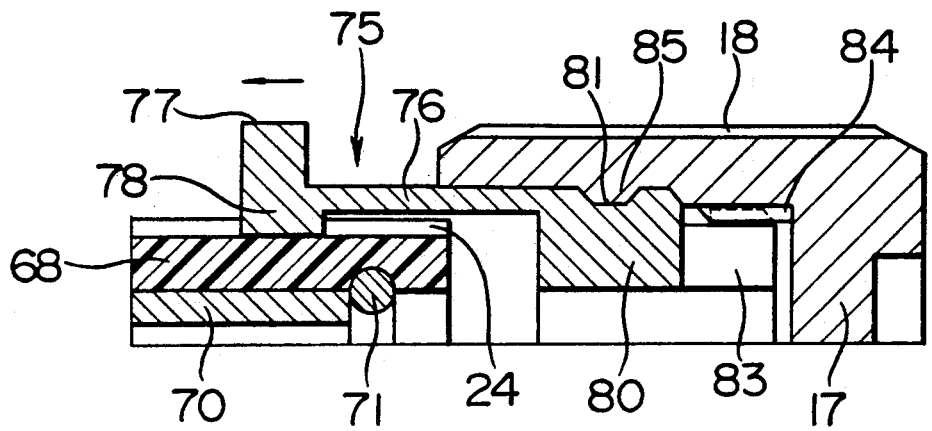
FIG. 19 is a view showing the FIG. 18 portion placed in different operational condition.

After completion of clamping, the buffer stop cylinder 75 is pushed rearward as shown at arrow in FIG. 18 so that the resilient pawls 80 are pushed down by the annular projection 85 so as to deflect downwards by their resiliency, thus permitting the projection 85 to engage the recesses 81 (FIG. 19) and the serrations 82 engaged the serrations 84 to securely couple the two grips 17 and 68 together (FIG. 19).

Consequently, a rotary member 65 and a main body 1 are securely coupled together to guard the rotary member 65 against becoming loose and against providing insufficient clamping even when the rotary member 65 is vibrated during working operation performed using the chuck. This state shown in FIG. 19 can be returned to the original state shown in FIG. 18 by withdrawing the buffer stop cylinder 75 in the direction of arrow in FIG. 19.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A chuck for tools comprising,
   a main body with an axially extending hole through said main body defining a longitudinal axis of the chuck,
   a plurality of oblique slots in the main body converging on said longitudinal axis to act as guides for jaw members,
   a plurality of jaws slidably received in said oblique slots, each of said jaws provided with an outer surface and a male thread portion,
   a rotary member having a female thread portion in meshing engagement with each of said male thread portions of said jaws and rotatably mounted on said main body,
   a first grip integrally connected to said main body,
   ball bearing mass interposed between said rotary member and said main body for minimizing friction between the two,
   a second grip rotatably coupled to the rotary member for applying a rotative torque to the rotary member,
   a buffer stop cylinder longitudinally movable relative to said first and second grips between first and second position,
   releasable locking means on the stop cylinder and said first and second grips for locking the first and second grips together when said buffer stop cylinder is positioned in said first position and releasing the first and second grips from each other when said buffer stop cylinder is positioned in said second position.

2. The chuck of claim 1 wherein the releasable locking means includes,
   a resilient pawl on the stop cylinder,
   coacting projection and recess means between the pawl and one of the grips for releasably connecting the pawl to the one grip,
   coacting serration means between said stop cylinder and said one grip for rotatably coupling the first and second grips together, and
   nonrotatable engaging means between the cylinder and the other of the grips.

* * * * *

UNITED STATES PATENT OFFICE
CERTIFICATE OF CORRECTION

Patent No. 5,009,439                             Dated   April 23, 1991

Inventor(s)  Iwao Sakamaki

It is certified that error appears in the above-identified patent and that said Letters Patent is hereby corrected as shown below:

Column 6, line 2, delete "66" and insert -- 46 --

Column 7, line 6, delete "interrupted" and insert -- interposed --

Column 7, line 27, delete "fast" and insert -- first --

Column 8, line 26, delete "mass" and insert -- means --

Signed and Sealed this

First Day of December, 1992

Attest:

DOUGLAS B. COMER

Attesting Officer                    Acting Commissioner of Patents and Trademarks